United States Patent
Lee et al.

(10) Patent No.: US 9,123,973 B2
(45) Date of Patent: Sep. 1, 2015

(54) ELECTROLYTE FOR LITHIUM SECONDARY BATTERY AND LITHIUM SECONDARY BATTERY COMPRISING THE SAME

(75) Inventors: Bora Lee, Yongin-si (KR); Yongbeom Lee, Yongin-si (KR); Sinyoung Park, Yongin-si (KR); Sunyoung Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 924 days.

(21) Appl. No.: 13/240,881

(22) Filed: Sep. 22, 2011

(65) Prior Publication Data

US 2012/0164519 A1 Jun. 28, 2012

Related U.S. Application Data

(60) Provisional application No. 61/426,367, filed on Dec. 22, 2010.

(51) Int. Cl.
| | |
|---|---|
| *H01M 10/0567* | (2010.01) |
| *H01M 6/16* | (2006.01) |
| *H01M 10/0569* | (2010.01) |
| *H01M 10/052* | (2010.01) |
| *H01M 10/42* | (2006.01) |

(52) U.S. Cl.
CPC ............ *H01M 10/0567* (2013.01); *H01M 6/16* (2013.01); *H01M 6/164* (2013.01); *H01M 6/168* (2013.01); *H01M 10/0569* (2013.01); *H01M 10/052* (2013.01); *H01M 10/4235* (2013.01); *H01M 2300/004* (2013.01); *H01M 2300/0025* (2013.01); *H01M 2300/0034* (2013.01); *H01M 2300/0037* (2013.01); *Y02E 60/122* (2013.01)

(58) Field of Classification Search
CPC ....... H01M 6/16; H01M 6/164; H01M 6/168; H01M 10/0567; H01M 10/0569; H01M 2300/0034; H01M 2300/0037; H01M 2300/004; H01M 10/052; Y02E 60/122
USPC ......... 429/307, 326, 332, 333, 335, 343, 199, 429/200, 163; 252/62.2
See application file for complete search history.

(56) References Cited

U.S. PATENT DOCUMENTS

| | | | |
|---|---|---|---|
| 5,830,600 A | 11/1998 | Narang et al. | |
| 7,476,468 B1 | 1/2009 | Lam et al. | |
| 2004/0038133 A1 | 2/2004 | Yamaguchi et al. | |
| 2005/0164093 A1 | 7/2005 | Otsuki et al. | |

FOREIGN PATENT DOCUMENTS

| | | | |
|---|---|---|---|
| EP | 1039570 A1 | | 9/2000 |
| EP | 2157656 A1 | | 2/2010 |
| EP | 2325936 A1 | | 5/2011 |
| JP | 07-249432 | | 9/1995 |
| KR | 1020010031892 A | | 4/2001 |
| KR | 1020040018096 | * | 3/2004 |
| KR | 1020040018096 A | | 3/2004 |
| KR | 1020050013144 A | | 2/2005 |

OTHER PUBLICATIONS

Extended European Search Report issued by the European Patent Office dated Apr. 2, 2012, 7 pages.
European Examination Report issued by the European Patent Office dated Mar. 18, 2013, 4 pages.

* cited by examiner

*Primary Examiner* — Laura Weiner
(74) *Attorney, Agent, or Firm* — Knobbe Martens Olson & Bear LLP

(57) ABSTRACT

The present disclosure relates to an electrolyte for a lithium secondary battery capable of improving safety and reliability of the lithium secondary battery and a lithium secondary battery comprising the electrolyte. The electrolyte for a lithium secondary battery of the present embodiments comprises a non-aqueous organic solvent, a lithium salt, flame retarding materials of fluoroalkyl ether and phosphazene, and a solvent comprising at least one ester.

8 Claims, 2 Drawing Sheets

ELECTROLYTE FOR LITHIUM SECONDARY BATTERY AND LITHIUM SECONDARY BATTERY COMPRISING THE SAME

CROSS-REFERENCE TO RELATED APPLICATIONS

This application claims priority to U.S. Provisional Application No. 61/426,367, filed on Dec. 22, 2010 which is incorporated herein in its entirety.

BACKGROUND

1. Field

The present embodiments relate to an electrolyte for a lithium secondary battery capable of improving safety and reliability of the lithium secondary battery and a lithium secondary battery comprising the electrolyte.

2. Description of the Related Technology

A mixed solution prepared by dissolving one or more lithium salts selected from $LiPF_6$, $LiBF_4$, LiBOB, LiFOB, LiTFSI, LiBETI and others into a mixed solvent consisting of cyclic esters such as EC, PC, BC, GBL, GVL and others, and chain esters such as DMC, EMC, DEC, DPC, acetate, propionate, butyrate, hexanoate and others is used as an electrolyte for a lithium secondary battery. However, these kinds of organic solvents may cause combustion, and they are vulnerable to safety. In order to decrease the danger, a way of enhancing flame retardancy by additionally mixing flame retarding additives of fluorine-based compounds or phosphorous compounds such as phosphate, phosphazene and others with an existing electrolyte has been examined.

However, it is difficult to practically apply the phosphate-based material to the electrolyte since phosphate-based material deteriorates ion conductivity and is easily subject to reduction in the negative electrode. Therefore, materials such as fluoroalkyl carbonate, fluoroalkyl ester and fluoroalkyl ether have been examined as alternative materials instead of the phosphate-based material.

Fluoroalkyl carbonate and fluoroalkyl ester among the materials are excellent in flame retardancy. However, fluoroalkyl carbonate and fluoroalkyl ester have high side reaction in the negative electrode and weaken interfacial properties. Therefore, it is difficult to use fluoroalkyl carbonate and fluoroalkyl ester in sufficient amounts for applying flame retardancy to the electrolyte. On the contrary, since fluoroalkyl ether has relatively low reductive cleavage in the negative electrode such that it is capable of improving safety of the batteries without greatly deteriorating performance of batteries. However, although the electrolyte should be used in an excessive amount of 50% by volume or more with respect to the total volume of the electrolyte such that fluoroalkyl ether is used to show flame retardancy, properties of the batteries deteriorate by an increase in the viscosity and a decrease in the ion conductivity in this case. Furthermore, there is a limitation that discharge capability during high rate discharge and capability during the cycle life at normal temperature decrease in that case.

SUMMARY

An aspect of the present embodiments provides a flame retarding electrolyte for a lithium secondary battery capable of improving safety and reliability even without deteriorating performance of the lithium secondary battery, and a lithium secondary battery comprising the electrolyte.

Another aspect of the present embodiments provides an electrolyte for a lithium secondary battery comprising a non-aqueous organic solvent, a lithium salt, flame retarding materials of fluoroalkyl ether and phosphazene, and a solvent comprising at least one ester.

The fluoroalkyl ether may be a compound represented by the following chemical formula 1:

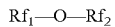  [Chemical Formula 1]

wherein $Rf_1$ and $Rf_2$ are independently a fluoroalkyl group having two or more carbon atoms, and the fluoroalkyl group has a fluoridation ratio of 50 to 100%.

The phosphazene may be a compound represented by the following chemical formula 2:

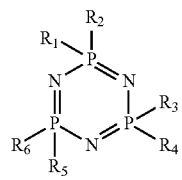  [Chemical Formula 2]

wherein $R_1$ to $R_6$ are independently F or O—$R_7$, wherein $R_7$ is an alkyl, a fluoroalkyl or an aromatic group.

The solvent comprising at least one ester may comprise compounds represented by the following chemical formula 3:

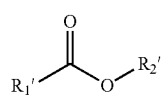  [Chemical Formula 3]

wherein $R_1'$ is an aliphatic hydrocarbon group with 1 to 4 carbon atoms, and $R_2'$ is an aliphatic hydrocarbon group with 1 to 5 carbon atoms.

The fluoroalkyl ether may be included in a 10 to 40% by volume with respect to the total volume of the electrolyte, the phosphazene-based compound may be included in 3 to 10% by volume, and the solvent comprising at least one ester may be included in a 20 to 70% by volume.

The fluoroalkyl ether, and flame retarding material of the phosphazene-based compound may be included in 13 to 50% by volume with respect to the total volume of the electrolyte.

A ratio of a content of fluoroalkyl ether to the sum of contents of the phosphazene-based compound and solvent comprising at least one ester may be a volume ratio of 0.15:1 to 1.5:1.

The non-aqueous organic solvent may comprise one or more solvents selected from the group consisting of ethylene carbonate (EC), fluoroethylene carbonate (FEC), propylene carbonate (PC), butylene carbonate (BC), γ-butyrolacton (GBL) and γ-valerolactone (GVL) as high dielectric constant/high boiling point solvents.

The non-aqueous organic solvent may further comprise one or more linear carbonate solvents selected from the group consisting of dimethyl carbonate (DMC), ethylmethyl carbonate (EMC), diethyl carbonate (DEC) and dipropyl carbonate (DPC), and/or fluorine-based solvents represented by the following chemical formula 4:

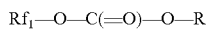  [Chemical Formula 4]

wherein $Rf_1$ is a fluoroalkyl group with 2 to 4 carbon atoms, and R is $CH_3$ or $C_2H_5$.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
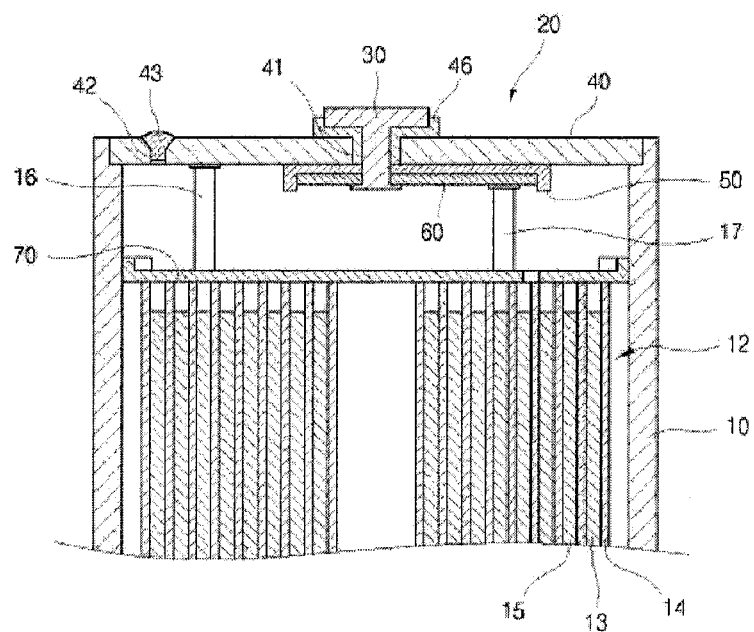
FIG. 1 illustrates a partial cross-sectional view of a lithium secondary battery according to an embodiment.

Hereinafter, an electrolyte for a lithium secondary battery of the present embodiments, and a lithium secondary battery comprise the electrolyte will be described in more detail with reference to embodiments.

An electrolyte for a lithium secondary battery according to an embodiment comprises a non-aqueous organic solvent, a lithium salt, flame retarding materials of fluoroalkyl ether and phosphazene, and a solvent comprising at least one ester.

The fluoroalkyl ether may be a compound represented by the following chemical formula 1:

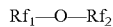   [Chemical Formula 1]

wherein $Rf_1$ and $Rf_2$ are independently a fluoroalkyl group having two or more carbon atoms, and the fluoroalkyl group has a fluoridation ratio of 50 to 100%.

In the above formula, the fluoroalkyl group represented by Rf1 and Rf2 may be an alkyl group having 2 or more carbon atoms, preferably 2 to 6 carbon atoms.

In the above formula, the fluorination ratio means a ratio in which substituent hydrogen atoms in an alkyl group were substituted with fluorine. For instance, in the case of $CF_2HCF_2CH_2$ group, the fluorination ratio is about 57% since four hydrogen atoms among seven hydrogen atoms of propyl group were substituted with fluorine.

The fluoroalkyl ether as flame retarding material is mixed along with the non-aqueous organic solvent to form a mixed solvent. Fluoroalkyl ether may be included in a 10 to 40% by volume with respect to the volume of the electrolyte. Fluoroalkyl ether has an inadequate effect of improving the safety of batteries since flame retardancy cannot be sufficiently given to the electrolyte if fluoroalkyl ether is added in an amount less than the foregoing range, and mobility of lithium ion may decrease to have a bad influence on life performance of batteries since viscosity of the electrolyte increases if fluoroalkyl ether is added in an amount more than the foregoing range.

The phosphazene may be a compound represented by the following chemical formula 2:

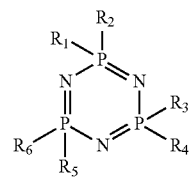   [Chemical Formula 2]

wherein $R_1$ to $R_6$ are independently F or O—$R_7$, wherein $R_7$ is an alkyl, a fluoroalkyl, or an aromatic group.

In the above formula, an alkyl group of the alkyl or fluoroalkyl group represented by $R_7$ has one or more carbon atoms, preferably 1 to 6 carbon atoms. The aromatic group presented by $R_7$ may be a phenyl, a naphthyl or a biphenyl group, which is substituted or unsubstituted with an alkyl or fluoroalkyl group with 1 to 6 carbon atoms.

The phosphazene as flame retarding material is mixed with the non-aqueous organic solvent to form a mixed solvent. The phosphazene may be included in 3 to 10% by volume with respect to the volume of the electrolyte. By adding the phosphazene in the above range, it is possible to reduce the total content of fluoroalkyl ether causing the viscosity to increase in the electrolyte. The phosphazene has an inadequate effect of improving the safety of batteries since flame retardancy cannot be sufficiently given to the electrolyte if the phosphazene is added in an amount less than the foregoing range, and phosphazene has a bad influence on life performance of the batteries although the safety of the batteries is improved if the phosphazene is added in an amount more than the foregoing range.

Flame retarding materials of the fluoroalkyl ether and phosphazene-based compound may be included in from about 13 to about 50% by volume with respect to the total volume of the electrolyte in the electrolyte. It is possible to obtain effects of improving safety and cycle life characteristics of batteries at the same time by adding the flame retarding materials in the foregoing range. The flame retarding materials have an inadequate effect of improving the safety of batteries since flame retardancy cannot be sufficiently given to the electrolyte if the flame retarding materials are added in an amount less than the foregoing range, and characteristics of the batteries are lowered due to an increase in electrolyte viscosity and a decrease in ion conductivity if the flame retarding materials are added in an amount more than the foregoing range.

The solvent comprising at least one ester may be a compound represented by the following chemical formula 3:

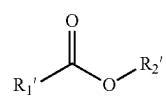   [Chemical Formula 3]

wherein $R_1'$ is an aliphatic hydrocarbon group with 1 to 4 carbon atoms, and $R_2'$ is an aliphatic hydrocarbon group with 1 to 5 carbon atoms.

In the above formula, the aliphatic hydrocarbon group represented by $R_1'$ and $R_2'$ may be an alkyl, an alkenyl or an alkynyl group.

Examples of the solvent comprising at least one ester may comprise methyl acetate, ethyl acetate, propyl acetate, butyl acetate, methyl propionate, ethyl propionate, propyl propionate, methyl butyrate, methyl valerate, and others.

The solvent comprising at least one ester may be added to improve ion conductivity is mixed along with the non-aqueous organic solvent to form a mixed solvent. The solvent comprising at least one ester is capable of improving ion conductivity of the electrolyte more than a linear carbonate solvent. The solvent comprising at least one ester may be included in 20 to 70% by volume with respect to the volume of the electrolyte. The solvent comprising at least one ester is capable of lowering viscosity of the electrolyte and improving ion conductivity by adding the solvent comprising at least one ester in the foregoing range. The solvent comprising at least one ester has a viscosity dropping effect of the electrolyte and an inadequate effect of improving ion conductivity of the electrolyte if the solvent comprising at least one ester is added in an amount less than the foregoing range, and the solvent comprising at least one ester has a bad influence on the safety of batteries since contents of the flame retarding materials in the electrolyte decrease if the solvent comprising at least one ester is added in an amount more than the foregoing range.

It is preferable that a ratio of content of fluoroalkyl ether to the sum of contents of the phosphazene-based compound and solvent comprising at least one ester is a volume ratio of from about 0.15:1 to about 1.5:1. Content ratios of fluoroalkyl ether, phosphazene-based compound, and solvent comprising at least one ester in the mixed solvent satisfy the foregoing condition to provide an electrolyte having low viscosity and high ion conductivity while maintaining flame retardancy. Fluoroalkyl ether has a bad influence on safety of batteries if a content ratio of fluoroalkyl ether is less than 0.15, and fluoroalkyl ether has a bad influence on the cycle life characteristics of the batteries if the content ratio of fluoroalkyl ether is more than 1.5.

Examples of the non-aqueous organic solvent may comprise solvent selected from the group consisting of carbonate-based solvent, lactone-based solvent, ether-based solvent and ketone-based solvent, or solvent mixtures thereof.

Examples of the carbonate-based solvent may comprise dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylenes carbonate (BC), and others.

Examples of ethylene carbonate may comprise difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and others.

Examples of the lactone-based solvent may comprise γ-butyrolactone, γ-valerolactone, decanolide, mevalonolactone, caprolactone, and others.

Examples of the ether-based solvent may comprise dibutyl ether, tetraglyme, diglyme, dimethoxyethane, 2-methyl tetrahydrofuran, tetrahydrofuran, and others.

Examples of the ketone-based solvent may comprise cyclohexanone, poly(methyl vinyl ketone), and others.

The above non-aqueous organic solvents may be used independently or in a mixture form of one or thereof. A mixing ratio of the non-aqueous organic solvents may be properly adjusted according to target performance of the batteries if the non-aqueous organic solvents are used in the mixture form of one or more thereof The non-aqueous organic solvent preferably comprises one or more solvents selected from the group consisting of ethylene carbonate (EC), fluoroethylene carbonate (FEC), propylene carbonate (PC), butylene carbonate (BC), γ-butyrolactone (GBL), and γ-valerolactone (GVL) as high dielectric constant/high boiling point solvents.

If the non-aqueous organic solvent comprises ethylene carbonate, ethylene carbonate may be included at from about 5 to about 30% by volume with respect to volume of the electrolyte. Conduction of ions is not smoothly performed since ion dissociation degree in an electrolyte is lowered if ethylene carbonate is added in an amount less than the foregoing range, and performance of batteries deteriorates since viscosity of the electrolyte increases if ethylene carbonate is added in an amount more than the foregoing range.

Furthermore, the non-aqueous organic solvent may further comprise one or more linear carbonate solvents selected from the group consisting of dimethyl carbonate (DMC), ethylmethyl carbonate (EMC), diethyl carbonate (DEC) and dipropyl carbonate (DPC), and/or a fluorine-based solvent represented by the following chemical formula 4:

$Rf_1$—O—C(=O)—O—R     [Chemical Formula 4]

wherein $Rf_1$ is a fluoroalkyl group with 2 to 4 carbon atoms, and R is $CH_3$ or $C_2H_5$.

The fluorine-based solvent represented by the foregoing chemical formula 4 may be added to increase flame retardancy of the electrolyte, and the fluorine-based solvent may be included at from about 1 to about 10% by volume with respect to volume of the electrolyte. Flame retardancy cannot be sufficiently given to the electrolyte if the fluorine-based solvent is added in an amount less than the foregoing range, and cycle life characteristics of the batteries are lowered although safety of batteries is improved if the fluorine-based solvent is added in an amount more than the foregoing range.

The lithium salt acts as a supply source of lithium ions in batteries to allow for basic operation of lithium secondary batteries, and plays a role in promoting the movement of lithium ions between positive and negative electrodes. The lithium salt may be $LiPF_6$ alone, or a salt mixture of $LiPF_6$ and one or more salts selected from the group consisting of $LiBF_4$, LiFOB, LiBOB, $LiN(SO_2CF_3)_2$, $LiN(SO_2C_2F_5)_2$, LiFSI, and $LiN(SO_2C_2F_4SO_2)$. The lithium salt is preferably a lithium salt which has low lattice energy and high dissociation degree such that the lithium salt is excellent in ion conductivity and has good thermal stability and oxidation resistance.

It is preferable to use the lithium salt within a concentration range of from about 0.5 to about 1.5 M. The lithium salt has problems that performance of the electrolyte deteriorates since conductivity of an electrolyte is lowered if the concentration of the lithium salt is less than 0.5 M, and mobility of lithium ions decreases since viscosity of the electrolyte increases if the concentration of the lithium salt is more than about 1.5 M.

Furthermore, an electrolyte for a lithium secondary battery of the present embodiments may further comprise one or more compounds selected from the group consisting of vinylene carbonate (VC), vinyl ethylene carbonate (VEC), succinic acid nitrile (SN), succinic anhydride (SA), and propene sultone in addition to the above-described non-aqueous organic solvent, lithium salt, fluoroalkyl ether, phosphazene, and solvent comprising at least one ester. The compounds may be added as cycle life-improving additives for improving cycle lives of batteries, and amounts of the compounds used can be appropriately adjusted.

Hereinafter, a lithium secondary battery comprising an electrolyte for a lithium secondary battery according to embodiments will be described.

FIG. 1 illustrates a partial cross-sectional view of a lithium secondary battery according to embodiments.

Referring to FIG. 1, a lithium secondary battery according to embodiments includes a container 10, an electrode assembly 12, a cap assembly 20, and an electrolyte. In the lithium secondary battery, the electrode assembly 12 and electrolyte are housed in the container 10, and the cap assembly 20 is formed by sealing a top part of the container.

The electrode assembly 12 includes a positive electrode plate 13, a negative electrode plate 15, and a separator 14. The electrode assembly 12 may be formed by coiling the laminated layers after sequentially laminating the positive electrode plate 13, separator 14, and negative electrode plate 15.

The positive electrode plate 13 is formed by applying positive electrode active materials on the surface of a positive electrode collector. Aluminum, aluminum alloys, and others can be used as the positive electrode collector. The positive electrode collector may be formed in the form of a foil or mesh. The mixture is applied on the surface of the positive electrode collector after preparing a mixture in a slurry state by dispersing the positive electrode active material into solvent along with a binder and conductive material, and thickening agent if necessary.

The positive electrode active material comprises material into which lithium ions can be reversibly interposed, and from which the lithium ions can be reversibly separated. Examples of the positive electrode active material may include composite metal oxides of lithium and at least one selected from cobalt, manganese, and nickel. The positive electrode active material may additionally include elements selected from the group consisting of Mg, Al, Co, K, Na, Ca, Si, Ti, Sn, V, Ge, Ga, B, As, Zr, Mn, Cr, Fe, Sr, V, and rare earth elements.

The negative electrode plate 15 is formed by applying negative electrode active material on the surface of an negative electrode collector. Copper, copper alloys and others may be used as the negative electrode collector. The negative electrode collector may be formed in the form of a foil or mesh. The mixture is applied on the surface of the negative electrode collector after preparing a mixture in a slurry state by dispersing the negative electrode active material into solvent along with a binder and conductive material, and thickening agent if necessary.

The negative electrode active material comprises material into which lithium ions can be interposed, and from which the lithium ions can be separated. Examples of the negative electrode active material may include carbon-based negative electrode active material (thermally decomposed carbon, coke or graphite) of crystalline or amorphous carbon, or carbon composite, burnt organic polymer compound, carbon fiber, tin oxide compound, lithium metal, or alloys of lithium and other elements. Examples of the amorphous carbon may include hard carbon, coke, mesocarbon microbeads (MCMB) baked at 1500° C. or less, mesophase pitch-based carbon fiber (MPCF), and others. The crystalline carbon may include graphite-based material, specifically include natural graphite, graphitized coke, graphitized MCMB, graphitized MPCF, and others.

The separator 14 is located between the positive electrode plate 13 and negative electrode plate 15 to prevent a short circuit of the positive electrode plate 13 and negative electrode plate 15. Examples of the separator 14 may include well-known materials such as polymer membranes of polyolefin, polypropylene and polyethylene or multilayer films thereof, microporous films, woven fabrics, and nonwoven fabrics.

The cap assembly 20 may include a cap plate 40, an insulation plate 50, a terminal plate 60, and an electrode terminal 30. The cap assembly 20 is assembled with an insulation case 70 to seal the container 10.

The electrode terminal 30 is inserted into a terminal through-hole 41 formed in the center of the cap plate 40. The electrode terminal 30 is inserted into the terminal through-hole 41 together with the tube type gasket in a state that a tube type gasket 46 is coupled to the outer face of the electrode terminal 30 when inserting the electrode terminal 30 into the terminal through-hole 41. Therefore, the electrode terminal 30 is electrically insulated with the cap plate 40.

The electrolyte is injected into the container 10 through an electrolyte injection hole 42 after the cap assembly 20 is assembled onto the top part of the container 10. The electrolyte injection hole 42 is sealed by a separate stopper 43. The electrode terminal 30 is connected to a negative electrode tab 17 of the negative electrode plate 15 or a positive electrode tab 16 of the positive electrode plate 13 such that the electrode terminal 30 is operated as a negative terminal or a positive terminal.

On the other hand, the lithium secondary battery can be formed in a unit cell constructed in a structure of positive electrode plate/separator/negative electrode plate, a bi-cell constructed in a structure of positive electrode plate/separator/negative electrode plate/separator/positive electrode plate, or a layer-built cell constructed in such a structure that unit cells are repeated.

Further, a lithium secondary battery of the present embodiments can be formed in a cylinder type, a pouch type, or other shape besides the illustrated prismatic type.

Hereinafter, the present embodiments will be described in more detail with reference to the following Embodiments and Comparative Examples. However, the following Embodiments and Comparative Examples are provided for illustrative purposes only, and the scope of the present embodiments should not be limited thereto in any manner.

Example 1

A positive electrode active material slurry was prepared by dispersing $LiCoO_2$ as positive electrode active material, polyvinylidene fluoride (PVdF) as binder, and carbon as conductive material into N-methyl-2-pyrrolidone solvent in a weight ratio of 92:4:4. A positive electrode plate was manufactured by coating the positive electrode active material slurry on an aluminum foil with a thickness of 15 μm, drying the positive electrode active material slurry coated on the aluminum foil, and rolling the dried positive electrode active material slurry coated on the aluminum foil. An negative electrode active material slurry was prepared by dispersing the mixture into water after mixing graphite as negative electrode active material, styrene-butadiene rubber (SBR) as binder, and carboxymethyl cellulose (CMC) as thickening agent in a weight ratio of 96:2:2. An negative electrode plate was manufactured by coating the negative electrode active material slurry on a copper foil with a thickness of 10 μM, drying the negative electrode active material slurry coated on the copper foil, and rolling the dried negative electrode active material slurry coated on the copper foil.

The coiled layers were inserted into a rectangular container having dimensions of 46 mm×34 mm×50 mm after inserting a polyethylene (PE) separator with a thickness of 18 μm between the electrode plates and coiling the respective layers. An electrolyte was injected into the container to manufacture a lithium secondary battery.

The electrolyte was prepared by mixing 1.0 M of $LiPF_6$ with a solvent mixture of ethylene carbonate (EC), fluoroethylene carbonate (FEC), fluoroalkyl ether (FE), phosphazene (Pz), and solvent comprising at least one ester. Fluoroalkyl ether was a compound of $CF_2H$—$CF_2$—$CH_2$—O—$CF_2$—

$CF_2H$, phosphazene was a compound of the chemical formula 2 ($R_1$-$R_5$=F and $R_6$=$OCH_2CH_3$), and the solvent comprising at least one ester was a compound of ethyl propionate ($C_2H_5$—C(=O)O—$C_2H_5$).

A composition for the solvent mixture is as shown in the following Table 1.

Examples 2 to 17

Lithium secondary batteries were manufactured in Examples 2 to 17 in the same method as in Example 1 except that compositions for solvent mixtures of electrolytes in Examples 2 to 17 were prepared as shown in the following Table 1.

TABLE 1

| | Solvent mixture (% by volume) | | | | | | |
|---|---|---|---|---|---|---|---|
| | EC | FEC | FE | Pz | EMC | FC | Solvent comprising at least one ester |
| Example 1 | 20 | 5 | 10 | 3 | — | — | Ester1 62 |
| Example 2 | 20 | 5 | 10 | 3 | — | — | Ester2 62 |
| Example 3 | 20 | 5 | 10 | 3 | — | — | Ester3 62 |
| Example 4 | 20 | 5 | 20 | 5 | — | — | Ester1 50 |
| Example 5 | 20 | 5 | 20 | 5 | — | — | Ester2 50 |
| Example 6 | 20 | 5 | 20 | 5 | — | — | Ester3 50 |
| Example 7 | 20 | 5 | 20 | 5 | — | — | Ester4 50 |
| Example 8 | 20 | 5 | 20 | 5 | — | — | Ester5 50 |
| Example 9 | 20 | 5 | 20 | 5 | — | — | Ester6 50 |
| Example 10 | 20 | 5 | 40 | 10 | — | — | Ester1 25 |
| Example 11 | 20 | 5 | 40 | 10 | — | — | Ester2 25 |
| Example 12 | 20 | 5 | 40 | 10 | — | — | Ester3 25 |
| Example 13 | 20 | 5 | 40 | 10 | 5 | — | Ester1 20 |
| Example 14 | 20 | 5 | 40 | 10 | 5 | — | Ester2 20 |
| Example 15 | 20 | 5 | 40 | 10 | 5 | — | Ester3 20 |
| Example 16 | 20 | 5 | 40 | 10 | — | 5 | Ester1 20 |
| Example 17 | 20 | 5 | 40 | 10 | 2 | 3 | Ester1 20 |

In the above table,
EC: ethylene carbonate
FEC: fluoroethylene carbonate
FE: fluoroalkyl ether ($CF_2H$—$CF_2$—$CH_2$—O—$CF_2$—$CF_2H$)
Pz: phosphazene (compound of the chemical formula 2, wherein $R_1$-$R_5$ = F, and $R_6$ = $OCH_2CH_3$)
EMC: ethylmethyl carbonate
FC: fluoroethylmethyl carbonate ($CF_2H$—$CF_2$—OC(=O)O—$CH_3$)
Ester1: ethyl propionate ($C_2H_5$—C(=O)O—$C_2H_5$)
Ester2: propyl acetate ($CH_3$—C(=O)O—$C_3H_7$)
Ester3: methyl butyrate ($C_3H_7$—C(=O)O—$CH_3$)
Ester4: propyl propionate ($C_2H_5$—C(=O)O—$C_3H_7$)
Ester5: butyl acetate ($CH_3$—C(=O)O—$C_4H_9$)
Ester6: methyl valerate ($C_4H_9$—C(=O)O—$CH_3$)

Comparative Examples 1 to 12

Lithium secondary batteries were manufactured in Comparative Examples 1 to 12 in the same method as in Example 1 except that compositions for solvent mixtures of electrolytes in Comparative Examples 1 to 12 were prepared as shown in the following Table 2.

TABLE 2

| | Solvent mixture (% by volume) | | | | | |
|---|---|---|---|---|---|---|
| | EC | FEC | FE | Pz | EMC | Solvent comprising at least one ester |
| Comparative Example 1 | 20 | 5 | 5 | — | 70 | — |
| Comparative Example 2 | 20 | 5 | 50 | — | 25 | — |
| Comparative Example 3 | 20 | 5 | — | 2 | 73 | — |
| Comparative Example 4 | 20 | 5 | — | 15 | 60 | — |
| Comparative Example 5 | 20 | 5 | 5 | 2 | 68 | — |
| Comparative Example 6 | 20 | 5 | 20 | 5 | 50 | — |
| Comparative Example 7 | 20 | 5 | 40 | 10 | 25 | — |
| Comparative Example 8 | 20 | 5 | 50 | 5 | — | Ester1 20 |
| Comparative Example 9 | 20 | 5 | 50 | 5 | — | Ester2 20 |
| Comparative Example 10 | 20 | 5 | 55 | 5 | — | Ester1 15 |
| Comparative Example 11 | 20 | 5 | 7 | 3 | — | Ester1 65 |
| Comparative Example 12 | 20 | 5 | 7 | 3 | — | Ester2 65 |

Compounds represented by respective constituents in the Table 2 are the same as those in the Table 1.

Hereinafter, described are experimental evaluations on electrolytes prepared by the examples and comparative examples and lithium secondary batteries comprising the electrolyte.

Viscosities and ion conductivities of the electrolytes were measured in methods as described below.

Experimental Example 1

Viscosity

Viscosities of electrolytes prepared in Examples 1 to 17 and Comparative Examples 1 to 12 were measured by a cone-plate type LVDV-II+Pro Viscometer manufactured by Brookfield Engineering Laboratories, Inc. in a dry room in which ambient temperature was constantly maintained to 20° C. S40 spindles were used as measuring spindles, rotation velocity was maintained to 10 revolutions per minute, and specimen loading was set to 1 mL. Viscosity values in cP (mPa·s) were measured in 30 seconds after rotating the shaft in a state that specimens were put into a specimen pan. The calculated values were shown in the following Tables 3 and 4 after measuring viscosity values of the same specimen twice in the same conditions and calculating average values of the measured viscosity values.

Experimental Example 2

Ion Conductivity

Figure 2:
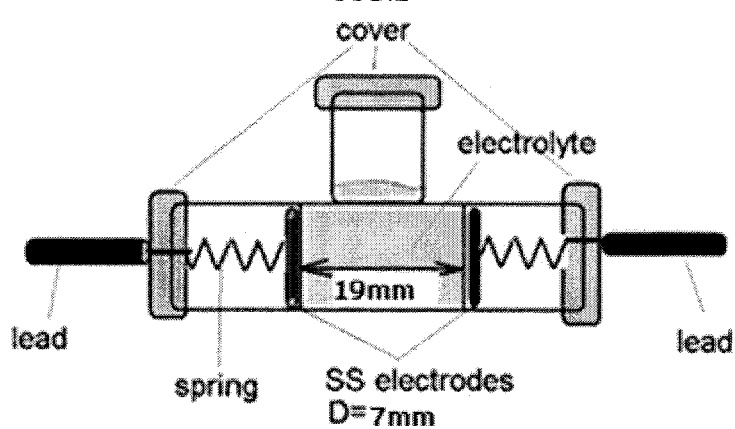
FIG. 2 illustrates a shape of T-cell in a measuring instrument for measuring ion conductivity of the electrolyte.

Ion conductivities of the electrolytes prepared in Examples 1 to 17 and Comparative Examples 1 to 12 were measured by an impedance analysis system manufactured by Lloyd Instruments Ltd or Solartron Instruments Ltd in a dry room in which ambient temperature was constantly maintained to 20° C. R (Ohm) values were obtained by measuring AC impedances after injecting 1.5 ml of specimen into a T-cell as illustrated in FIG. 2. Frequencies of the AC impedances were adjusted to a range of 100 Hz to 1 KHz, and AC amplitude values were set to 5 mV. The σ values were represented in the following Tables 3 and 4 after obtaining σ values (mS/cm) by using the measured R (Ohm) values in the following Expression 1.

Ion conductivity (S/cm):σ=K/R(Ω)  [Expression 1]

(where K=1/S=1/0.25·π·D²=1.9/0.25·3.14·0.7²=4.94 cm⁻¹, wherein l (cm) is 1.9 cm as a distance between electrodes, D (cm) is 0.7 cm as diameter of an SS electrode, and S (cm2) means cross-sectional view of the electrolyte.)

Further, evaluations on penetration safety, normal temperature cycle life, and high-rate discharging properties of lithium secondary batteries manufactured by the examples and comparative examples were performed by relevant methods as described below.

Experimental Example 3

Evaluation of Penetration Safety

Lithium secondary batteries manufactured in Examples 1 to 17 and Comparative Examples 1 to 12 were charged under 0.5C/4.35V_3 hr cutoff conditions. After penetrating a penetration pin with a dimension of 2.5 φ into the charged batteries, the batteries were marked as OK if there was no ignition in the batteries while the batteries were marked as NG if there was ignition in the batteries. The marks OK and NG were represented in the following Tables 3 and 4.

Experimental Example 4

Evaluation of Normal Temperature Cycle Life

The charged batteries were discharged at 25° C. for 10 minutes under 1° C./3. 1 V cutoff conditions after charging the lithium secondary batteries manufactured in Examples 1 to 17 and Comparative Examples 1 to 12 at 25° C. for 10 minutes under 1C/4.2V_0.05CmA cutoff conditions. After performing the charging/discharging process 300 times and calculating capacity retention ratio values (discharge capacities/initial capacities, %), the marks OK and NG were represented in the following Tables 3 and 4 by marking the values as OK if the values are not less than 85% and marking the values as NG if the values are less than 85%.

Figure 3:
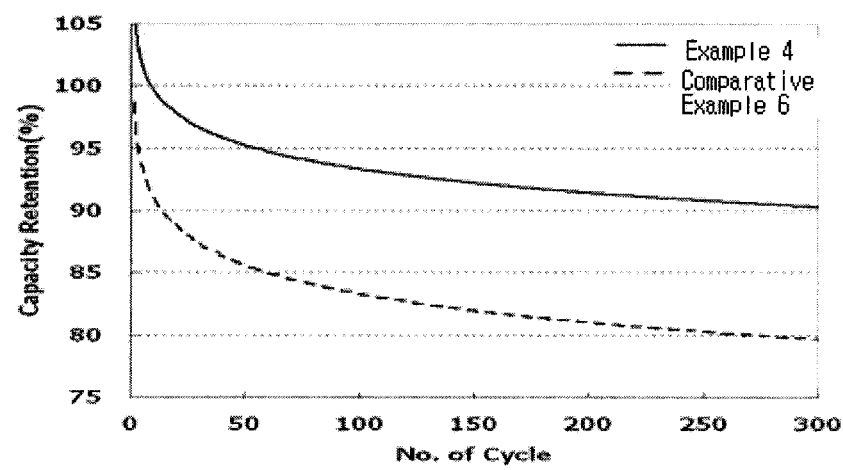
FIG. 3 is a graph illustrating normal temperature cycle life-evaluating results of batteries according to Example 4 and Comparative Example 6 of the present embodiments.

Further, the charging/discharging process of lithium secondary batteries manufactured in Examples 4 and 6 was performed up to 300 times under the same conditions as the foregoing conditions, and capacity retention ratio values (discharge capacities/initial capacities, %) were calculated and illustrated in FIG. 3.

Experimental Example 5

Evaluation of High-Rate Discharging Properties

Lithium secondary batteries manufactured in Examples 4 and 10 and Comparative Examples 6 and 7 were charged at 25° C. for 10 minutes under 0.5C/4.2V_0.05CmA cutoff conditions, and the charged batteries were discharged at 25° C. for 10 minutes under 0.2C/3.2 V, 0.5 C/3.2 V, 0.8 C/3.2 V, 1 C/3.2 V, 2 C/3.2 V, and 3 C/3.2 V cutoff conditions. Relative discharge capacities per discharge conditions (discharge capacities per respective conditions/0.2 C discharge capacity, %) were calculated and illustrated in FIG. 4.

TABLE 3

| | Viscosity (cP) | Ion conductivity σ (mS/cm) | Penetration safety | Cycle life |
|---|---|---|---|---|
| Example 1 | 4.01 | 9.15 | OK | OK |
| Example 2 | 4.35 | 8.19 | OK | OK |
| Example 3 | 4.66 | 8.02 | OK | OK |
| Example 4 | 4.12 | 8.79 | OK | OK |
| Example 5 | 4.42 | 8.65 | OK | OK |
| Example 6 | 4.73 | 8.51 | OK | OK |
| Example 7 | 4.81 | 8.49 | OK | OK |
| Example 8 | 4.79 | 8.42 | OK | OK |
| Example 9 | 4.71 | 8.36 | OK | OK |
| Example 10 | 4.55 | 8.59 | OK | OK |
| Example 11 | 4.89 | 8.22 | OK | OK |
| Example 12 | 4.92 | 8.20 | OK | OK |
| Example 13 | 4.85 | 8.12 | OK | OK |
| Example 14 | 4.97 | 8.04 | OK | OK |
| Example 15 | 5.01 | 8.00 | OK | OK |
| Example 16 | 4.88 | 8.09 | OK | OK |
| Example 17 | 4.86 | 8.11 | OK | OK |

TABLE 4

| | Viscosity (cP) | Ion conductivity σ (mS/cm) | Penetration safety | Cycle life |
|---|---|---|---|---|
| Comparative Example 1 | 6.92 | 7.06 | NG | OK |
| Comparative Example 2 | 8.31 | 5.02 | OK | NG |
| Comparative Example 3 | 6.88 | 7.01 | NG | OK |
| Comparative Example 4 | 6.67 | 6.98 | OK | NG |
| Comparative Example 5 | 6.72 | 7.00 | NG | OK |
| Comparative Example 6 | 7.01 | 6.80 | OK | NG |
| Comparative Example 7 | 8.97 | 6.25 | OK | NG |
| Comparative Example 8 | 8.88 | 6.20 | OK | NG |
| Comparative Example 9 | 8.90 | 6.11 | OK | NG |
| Comparative Example 10 | 8.91 | 5.85 | OK | NG |
| Comparative Example 11 | 4.00 | 9.17 | NG | OK |
| Comparative Example 12 | 4.31 | 8.22 | NG | OK |

Examples 1 to 12 represent fluoroalkyl ether, phosphazene, and solvent comprising at least one ester of which contents had been respectively adjusted within preferred ranges, and respective experimental results are represented in the Table 3 with respect to the adjusted content ranges of fluoroalkyl ether, phosphazene, and solvent comprising at least one ester. As shown in Table 3, the experimental results could satisfy safety and reliability levels desired in batteries since viscosities of electrolytes were low while ion conductivities of the electrolytes were high.

Linear carbonate solvent was added in electrolytes of Examples 13 to 17. Although solvent comprising at least one ester is put into the mixtures to lower viscosities of the electrolytes and increase ion conductivities of the electrolytes by adding solvent comprising at least one ester in the mixtures after preparing mixtures by mixing fluoroalkyl ether and phosphazene such that 50% by volume of mixtures of fluoroalkyl ether and phosphazene is contained in the mixed solvents, it is possible to add linear carbonate in the electrolytes so as to additionally satisfy desired performance of the batteries.

Fluoroalkyl ether is added in the mixed solvent in a small amount less than 10% by volume in Comparative Example 1, and fluoroalkyl ether is added in the mixed solvent in an excessive amount more than 40% by volume in Comparative Example 2. It can be seen as represented in the Table 4 that viscosities of electrolytes increase to lower ion conductivities of the electrolytes accordingly. The mixed solvents do not have effects in safety of the batteries—although the mixed solvents do not have a bad influence on performance in cycle life characteristics of batteries if fluoroalkyl ether is used in a small amount. On the other hand, the mixed solvents do have a bad influence on performance in cycle life characteristics of the batteries although safety of the batteries is improved if fluoroalkyl ether is used in an excessive amount.

Phosphazene is added in the mixed solvent in a small amount less than 3% by volume in Comparative Example 3, and phosphazene is added in the mixed solvent in an excessive amount more than 10% by volume in Comparative Example 4. As in Comparative Examples 1 and 2, it is difficult to obtain an effect of improving safety of the batteries if phosphazene is used in a small amount, and it is possible to confirm a trade-off phenomenon in which performance in cycle life characteristics of the batteries deteriorate although safety of the batteries is improved if phosphazene is used in an excessive amount.

Only linear carbonate solvent was added in electrolytes of Comparative Examples 5 to 7 in a state that solvent comprising at least one ester was not added in mixtures of fluoroalkyl ether and phosphazene. It can be confirmed that there is a problem in safety of the batteries since fluoroalkyl ether and phosphazene were added in the mixed solvent in small amounts in Comparative Example 5. Although safety of the batteries were improved since fluoroalkyl ether and phosphazene were added in mixed solvents in amounts that are capable of exhibiting flame retarding effects in Comparative Examples 6 and 7, it was not possible to obtain effects of dropping viscosities of the electrolytes and effects of sufficiently improving ion conductivities of the electrolytes since solvent comprising at least one ester was not added in the mixtures. Therefore, it could be confirmed that cycle life characteristics of the batteries were bad.

Fluoroalkyl ether and phosphazene were added in mixed solvents in excessive amounts in Comparative Examples 8 to 10 such that mixtures of fluoroalkyl ether and phosphazene had contents of exceeding 50% by volume. It can be seen in cases of the Comparative Examples 8 to 10 that it is not possible to effectively lower viscosities of electrolytes or increase ion conductivities of the electrolytes although the solvent comprising at least one ester was added in the mixed solvents. That is, it can be seen that there are no effects of dropping viscosities of the electrolytes although the solvent comprising at least one ester is added in the mixed solvents if flame retarding materials of fluoroalkyl ether and phosphazene are contained in an amount more than 50% by volume with respect to total volumes of the electrolytes.

Fluoroalkyl ether and phosphazene were added in mixed solvents in small amounts in Comparative Examples 11 and 12 such that mixtures of fluoroalkyl ether and phosphazene had contents of less than 13% by volume. It can be seen in cases of the Comparative Examples 11 and 12 that it was difficult to obtain an effect of improving safety of the batteries since fluoroalkyl ether and phosphazene are mixed in small amounts of less than 13% by volume although performance in cycle life characteristics of the batteries was improved by adding solvent comprising at least one ester in the mixed solvents. That is, it can be seen that there are trade-off phenomena in which safety of the batteries deteriorated while cycle life characteristics of the batteries were improved although the solvent comprising at least one ester was added in the mixed solvents if flame retarding materials of fluoroalkyl ether and phosphazene were contained in an amount less than 13% by volume with respect to total volumes of the electrolytes.

Therefore, the mixtures were used to obtain an effect of improving safety as well as cycle life characteristics of the batteries after mixing fluoroalkyl ether and phosphazene with the mixed solvents within flame retarding material ratio ranges capable of maintaining safety performance of the batteries.

Further, it can be seen that lives of the batteries are lowered since ratios of content of fluoroalkyl ether to content sums of phosphazene-based compounds and solvents comprising at least one ester exceed 1.5 in Comparative Examples 8 to 10, and safeties of the batteries are lowered since ratios of content of fluoroalkyl ether to content sums of phosphazene-based compounds and solvents comprising at least one ester are less than 0.15 in Comparative Examples 11 and 12.

Figure 4:
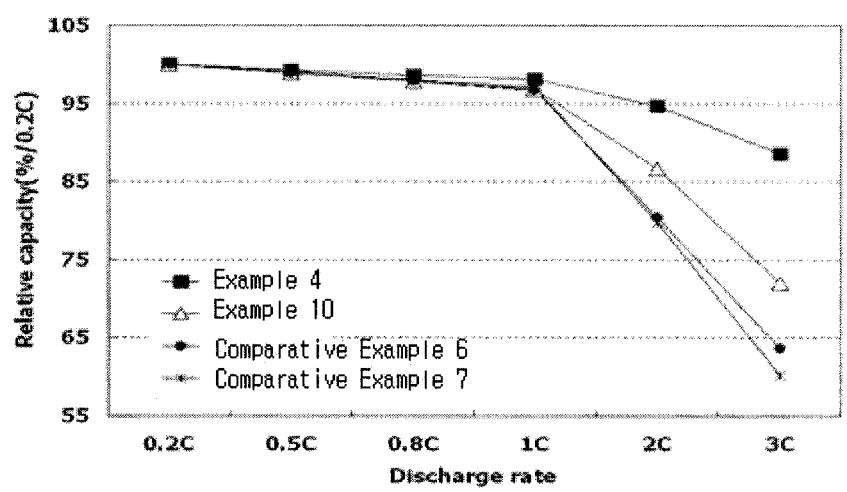
FIG. 4 is a graph illustrating evaluation results of high-rate discharging properties in batteries according to Examples 1 and 10 and Comparative Examples 6 and 7 of the present embodiments.

Fluoroalkyl ether, phosphazene, and solvent comprising at least one ester were mixed in the Example 4, and fluoroalkyl ether, phosphazene, and linear carbonate instead of the solvent comprising at least one ester were mixed in the Comparative Example 6. Since the solvent comprising at least one ester has a higher effect of lowering viscosity of flame retarding material and a higher ion conductivity than linear carbonate, it can be seen that at least 1C of high-rate discharging properties is improved in the battery in the Example 4 compared to the Comparative Example 6 as illustrated in FIG. 3. Further, it can be seen that cycle life characteristics of the battery are improved by reducing a decrease in the initial capacity of the battery and maintaining about 90% of the capacity at 300 cycles in the Example 4 in case of cycle life characteristics of a normal temperature as illustrated in FIG. 4.

Since an electrolyte for a lithium secondary battery of the present embodiments has a low viscosity and a high ion conductivity while maintaining flame retardancy, a lithium secondary battery comprising such electrolyte has superior effects of high safety and reliability.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. An electrolyte for a lithium secondary battery comprising a mixture of:
   a non-aqueous organic solvent comprising one or more of a cyclic carbonate-based solvent, a halogen substituted ethylene carbonate-based solvent, a lactone-based solvent, an ether-based solvent, a ketone-based solvent, a linear carbonate solvent and a fluorine-based solvent represented by the following chemical formula 4:

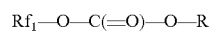
   $$Rf_1-O-C(=O)-O-R$$

wherein $Rf_1$ is a fluoroalkyl group with 2 to 4 carbon atoms, and R is $CH_3$ or $C_2H_5$;
   a lithium salt;
   a fluoroalkyl ether in an amount of from 10% to 40% by volume and represented by the following chemical formula:

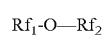
   $$Rf_1\text{-}O\text{-}Rf_2$$

wherein $Rf_1$ and $Rf_2$ are each independently a fluoroalkyl group having 2 to 6 carbon atoms and a fluorination ratio of 50% to 100%, a phosphazene in an amount of from 3% to 10% by volume represented by chemical formula 2:

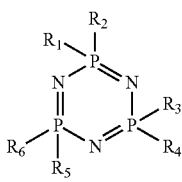

wherein $R_1$ to $R_6$ are independently F or O—$R_7$, wherein $R_7$ has 1 to 6 carbon atoms and is an alkyl group, a fluoroalkyl group or an aromatic group;

and a solvent comprising at least one ester in an amount of from 20% to 70% by volume;

wherein the at least one ester is represented by the following chemical formula 3:

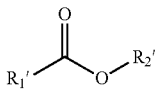

wherein $R_1'$ is an aliphatic hydrocarbon group with 1 to 4 carbon atoms, and $R_2'$ is an aliphatic hydrocarbon group with 1 to 5 carbon atoms, wherein the ratio of the fluoroalkyl ether to the sum of the phosphazene compound and the solvent comprising at least one ester is from about 0.15:1 to about 1.5:1.

2. The electrolyte of claim 1, wherein $R_7$ is an alkyl group.

3. The electrolyte of claim 1, wherein $R_1'$ and $R_2'$ are each independently selected from the group consisting of an alkyl group, an alkenyl group and an alkynyl group.

4. The electrolyte of claim 1, wherein the at least one ester comprises methyl acetate, ethyl acetate, propyl acetate, butyl acetate, methyl propionate, ethyl propionate, propyl propionate, methyl butyrate, methyl valerate, or a mixture thereof.

5. A secondary lithium battery comprising:
a container;
an electrode assembly;
a cap assembly; and
an electrolyte comprising a mixture of:
a non-aqueous organic solvent comprising one or more of a cyclic carbonate-based solvent, a halogen substituted ethylene carbonate-based solvent, a lactone-based solvent, an ether-based solvent, a ketone-based solvent, a linear carbonate solvent and a fluorine-based solvent represented by the following chemical formula 4:

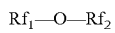

$Rf_1$—O—C(=O)—O—R wherein $Rf_1$ is a fluoroalkyl group with 2 to 4 carbon atoms, and R is $CH_3$ or a lithium salt;

a fluoroalkyl ether in an amount of from 10% to 40% by volume and represented by the following chemical formula:

$Rf_1$—O—$Rf_2$ wherein $Rf_1$ and $Rf_2$ are each independently a fluoroalkyl group having 2 to 6 carbon atoms and a fluorination ratio of 50% to 100%, a phosphazene in an amount of from 3% to 10% by volume represented by chemical formula 2:

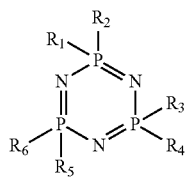

wherein $R_1$ to $R_6$ are independently F or O—$R_7$, wherein $R_7$ has 1 to 6 carbon atoms and is an alkyl group, a fluoroalkyl group or an aromatic group;

and a solvent comprising at least one ester in an amount of from 20% to 70% by volume;

wherein the at least one ester is represented by the following chemical formula 3:

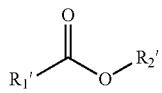

wherein $R_1'$ is an aliphatic hydrocarbon group with 1 to 4 carbon atoms, and $R_2'$ is an aliphatic hydrocarbon group with 1 to 5 carbon atoms, and wherein the ratio of the fluoroalkyl ether to the sum of the phosphazene compound and the solvent comprising at least one ester is from about 0.15:1 to about 1.5:1.

6. The secondary lithium battery of claim 5, wherein $R_7$ is an alkyl group.

7. The secondary lithium battery of claim 5, wherein $R_1'$ and $R_2'$ are each independently selected from the group consisting of an alkyl group, an alkenyl group and an alkynyl group.

8. The secondary lithium battery of claim 5, wherein the at least one ester comprises methyl acetate, ethyl acetate, propyl acetate, butyl acetate, methyl propionate, ethyl propionate, propyl propionate, methyl butyrate, methyl valerate, or a mixture thereof.

* * * * *